(12) United States Patent
Bremkens et al.

(10) Patent No.: US 11,304,382 B2
(45) Date of Patent: Apr. 19, 2022

(54) METHOD FOR CULTIVATING PLANTS

(71) Applicant: Orchideen-Bremkens KG, Geldern-Walbeck (DE)

(72) Inventors: Peter Bremkens, Geldern (DE); Christian Bremkens, Geldern (DE)

(73) Assignee: Orchideen-Bremkens KG

( * ) Notice: Subject to any disclaimer, the term of this patent is extended or adjusted under 35 U.S.C. 154(b) by 231 days.

(21) Appl. No.: 16/481,906

(22) PCT Filed: Jan. 8, 2018

(86) PCT No.: PCT/EP2018/050369
§ 371 (c)(1),
(2) Date: Jul. 30, 2019

(87) PCT Pub. No.: WO2018/141506
PCT Pub. Date: Aug. 9, 2018

(65) Prior Publication Data
US 2020/0037511 A1    Feb. 6, 2020

(30) Foreign Application Priority Data

Jan. 31, 2017   (DE) .......................... 102017101885.9

(51) Int. Cl.
*A01G 9/029*   (2018.01)
*A01G 9/02*    (2018.01)
*A01G 22/63*   (2018.01)
*A01G 9/00*    (2018.01)

(52) U.S. Cl.
CPC ........... *A01G 9/0295* (2018.02); *A01G 9/006* (2013.01); *A01G 9/028* (2013.01); *A01G 22/63* (2018.02)

(58) Field of Classification Search
CPC .... A01G 9/0295; A01G 9/0297; A01G 9/029; A01G 9/027; A01G 9/02; A01G 9/00; A01G 9/045; A01G 2009/003; A01G 9/028; A01G 9/04; A01G 9/0299; B65D 21/0233
See application file for complete search history.

(56) References Cited

U.S. PATENT DOCUMENTS 3,866,351 A * 2/1975 Cobia ..................... A01G 27/00
                                                    47/81
5,094,060 A * 3/1992 Caird ..................... B65D 85/52
                                                    206/423

(Continued)

FOREIGN PATENT DOCUMENTS

CN      101810111 A    8/2010
CN      102550265 A    7/2012

(Continued)

OTHER PUBLICATIONS

International Search Report dated Apr. 17, 2018.

*Primary Examiner* — Kristen C Hayes
(74) *Attorney, Agent, or Firm* — Husch Blackwell LLP

(57) ABSTRACT

A method for cultivating a plant, especially an orchid, is provided. The method involves a seedling at least partly surrounded by a substrate being introduced into a plant pot, the plant pot being introduced into one of multiple cells of a tray and the plant pot being immobilized in the cell, wherein the plant pot is introduced into the cell of the tray until a cell wall which is impenetrable for roots and especially unbreached towers above the plant pot.

12 Claims, 4 Drawing Sheets

(56) References Cited

U.S. PATENT DOCUMENTS

| | | | | |
|---|---|---|---|---|
| 5,664,370 | A * | 9/1997 | Boudreau | A01G 9/0295 47/87 |
| 8,782,950 | B2 * | 7/2014 | Miel | A01G 9/028 47/66.1 |
| 10,531,614 | B2 * | 1/2020 | Stott | A01G 9/02 |
| 2014/0041297 | A1 * | 2/2014 | Miel | A01G 9/02 47/66.6 |
| 2016/0029572 | A1 * | 2/2016 | Stott | A01G 9/04 47/66.7 |
| 2017/0064915 | A1 * | 3/2017 | Steelandt | A01G 9/029 |
| 2020/0000046 | A1 * | 1/2020 | Orschulik | A01G 9/028 |
| 2020/0037511 | A1 * | 2/2020 | Bremkens | A01G 9/0295 |

FOREIGN PATENT DOCUMENTS

| | | | | |
|---|---|---|---|---|
| DE | 102017101884 | A1 * | 8/2018 | A01G 9/028 |
| DE | 102017101885 | A1 * | 8/2018 | A01G 9/006 |
| EP | 2572571 | B1 | 9/2016 | |
| FR | 3034758 | A1 * | 10/2016 | A01G 9/045 |
| NL | 1000858 | C2 * | 1/1997 | A01G 9/088 |
| WO | 2009000480 | A1 | 12/2008 | |
| WO | 2009088774 | A2 | 7/2009 | |
| WO | 2015084163 | A1 | 6/2015 | |

\* cited by examiner

METHOD FOR CULTIVATING PLANTS

CROSS REFERENCE

This application claims priority to PCT Application No. PCT/EP2018/050369, filed Jan. 8, 2018, which itself claims priority to German Patent Application 10 2017 101885.9, filed Jan. 31, 2017, the entirety of both of which are hereby incorporated by reference.

FIELD OF THE INVENTION

The invention relates to a method for cultivating a plant, especially an epiphyte, especially an orchid, involving a seedling at least partly surrounded by a substrate being introduced into a plant pot, the plant pot being introduced into one of multiple cells of a tray and the plant pot being immobilized in the cell.

BACKGROUND

U.S. Pat. No. 5,022,183 shows a tray containing a plant pot into which a seedling surrounded by substrate can be introduced, and the plant pot can be introduced in the cell of the tray and immobilized therein. Such subject matter is used in accordance with an above-mentioned method.

A disadvantage of such a method, especially when cultivating epiphytes, is that, during the cultivation, parts of the plant, especially the roots, possibly also the leaves thereof, can adhere to the plant pot and/or the tray or can grow together with any recesses as a result of inward growth thereinto. Moreover, parts of the plant can grow across from one plant pot into an adjacent plant pot, where they can immobilize themselves such that removal of the plant without any damage is made difficult.

It is intended that the known method be improved to the effect that the removal of a plant from the tray is made possible with less damage.

SUMMARY OF THE INVENTION

According to the invention, this is achieved by a method of the type mentioned at the start, in which the plant pot is introduced into the cell of the tray until a cell wall which is impenetrable for roots and especially unbreached towers above the plant pot. Because the cell wall towers above the plant pot, the plant above the plant pot is at least partly further restricted to the cell and a mutual impairment of adjacent plants is thus reduced. The plant cannot grow together with the tray. Roots growing across from one plant pot into an adjacent plant pot in the tray, especially when cultivating an epiphyte, can be prevented better. Thus, plant removal from the plant pot that largely avoids damage to the plant, especially to the roots, becomes possible.

In one advantageous embodiment of the method, a completely laterally limited plant growth region which is impenetrable for roots and especially unbreached is offered above a plant pot base as a result of the introduction of the plant pot into the cell. Here, a plant growth region is the inner region of the plant pot and also the region of the cell from the plant pot edge up to an upper cell opening, which is made available to the plant to form its leaves and roots. The completely lateral unbreached boundary of this region largely prevents the roots of the plant from growing onto the plant pot or the cell. The plant can thus be removed from this region easily and with avoidance of damage.

Preferably, the plant pot and the cell of the tray are matched with one another such that a crossing point between the upper outer edge of the plant pot and the cell wall is impenetrable for roots. The plant growing together with the plant pot and the cell as a result of the root getting stuck between plant pot and cell is thus additionally avoided, and this further facilitates plant removal from the tray without any damage. A crossing point is considered impenetrable when the minimum clear width is less than 3 mm. In particular, the crossing point is impenetrable when it is formed by touching sections of plant pot and cell wall.

Advantageously, the removed plant is inserted into a substrate-filled plant pot. In this connection, the substrate-filled plant pot is regularly larger than the plant pot used in the tray. In particular, the new plant pot has a larger volume defined by the plant pot base and the plant pot wall. As a result, the plant receives more space for continued growth.

In a preferred embodiment of the method, the cultivated plant with the substrate is removed at the end of cultivation from the plant pot immobilized in the tray, the plant pot remaining in the cell of the tray. Plant removal from the plant pot is facilitated because the plant pot is immobilized in the cell. The plant pot remains behind. This method step is additionally supported by the plant pot having been introduced into the cell until a cell wall which is impenetrable for roots and especially unbreached towers above the plant pot. Adjacent plants growing together during cultivation is avoided as a result, meaning that removal of individual plants from the plant pot is thereby facilitated in comparison with a method which does not prevent adnascence. In particular, the plant does not get stuck with the plant pot and a tray matched therewith according to the invention as described, meaning that removal is improved.

The plant pot can be immobilized in the cell by means of at least one fixing means. For the immobilization, the plant pot is introduced into the cell of the tray until the at least one fixing means brings about an engagement between plant pot and cell.

The fixing means used can be a mechanical and/or some other fixing means. For example, it is conceivable to provide an adhesion point, by means of which tray and plant pot are fixed to one another, for example via bonding or melting.

Advantageously, the plant in the plant pot is cultivated in at least two growth phases, the plant pots being repositioned at greater intervals between first and second growth phase. For example, the first growth phase takes place with the plant pots outside the tray. As a result, the plant pots can be spaced at a closer interval, meaning that area utilization during cultivation is improved and the costs of the method drop. The first growth phase is ended before an impairment of adjacent plants, especially adnascence due to their roots, can occur. After a first growth phase, when the plants have become larger and thus start to influence each other, the plant pots are repositioned at greater intervals. For example, this can arise by introduction of the plant pots into an appropriate tray, in accordance with the invention. Thus, more space is made available to the plants in the second growth phase for their further development.

Particularly advantageously, the plant pots are arranged in crates for the first growth phase. As a result, the plant pots are arranged at a defined interval in relation to one another and multiple plant pots at once can be handled via a crate.

In one advantageous embodiment of the method, the plant pots are sorted after the first growth phase on the basis of features to assess development. In particular, equally developed plants are combined and differently developed plants are separated from one another, with the result that they can in each case experience optimal growth conditions later on, especially in the second growth phase. Undeveloped or very poorly developed plants can be excluded from further treatments at this point. The features used to assess development here are preferably the size of the plants, the shape, color and/or number of leaves, number of inflorescences, and also shape, color, size and/or number of blossoms or buds, in each case alone or in combination with other features. This reduces investments in non-profitable plants and increases the economy of the method. Particularly advantageously, the sorting is done by means of an automated visual evaluation. In combination with the inventive introduction of the plant pot into the tray, mutual influencing is then more or less minimized in identical growth states or sizes of plants present.

Preferably, the tray and/or the plants situated in the inserted plant pots are configured at the end of cultivation. In this context, configuring means that finishing tasks are performed on the tray or the plants. These include, for example, the packing or covering of individual regions of the tray, for example an upper side of the cell. The plants combined in the tray subsequently meet customer needs.

Particularly advantageously, in the tray, plant pots containing maldeveloped plants are replaced with plant pots containing well-developed plants. This can ensure that the plants arranged in the tray exhibit the same degree of development. Further use is thus facilitated.

Likewise, it may be advantageous for the plants to be oriented by twisting the plant pots in the tray. This can either be done such that the plants receive an identical orientation or by the plant pots being oriented such that the plants receive in each case the best possible space for their leaves. Particularly advantageously, fertilizers are introduced into the plant pots, optionally tailored to the different sizes of the plants in order to likewise bring the plants to the same size as far as possible.

Advantageously, the tray and/or the plant pots are labelled. Such labelling can, for example, be achieved by affixing a sticker containing a number or a bar code.

BRIEF DESCRIPTION OF THE DRAWINGS

Reference is now made more particularly to the drawings, which illustrate the best presently known mode of carrying out the invention and wherein similar reference characters indicate the same parts throughout the views. Further aspects of the method according to the invention can be gathered from the following description of the figures, where.

DETAILED DESCRIPTION OF THE DRAWINGS

Where appropriate, equivalent elements of the invention are provided below with a uniform reference number. The features of the exemplary embodiments, as described below, can also be subject matter of the invention in feature combinations other than as presented and in combination with at least the features of the independent claim.

Figure 1:
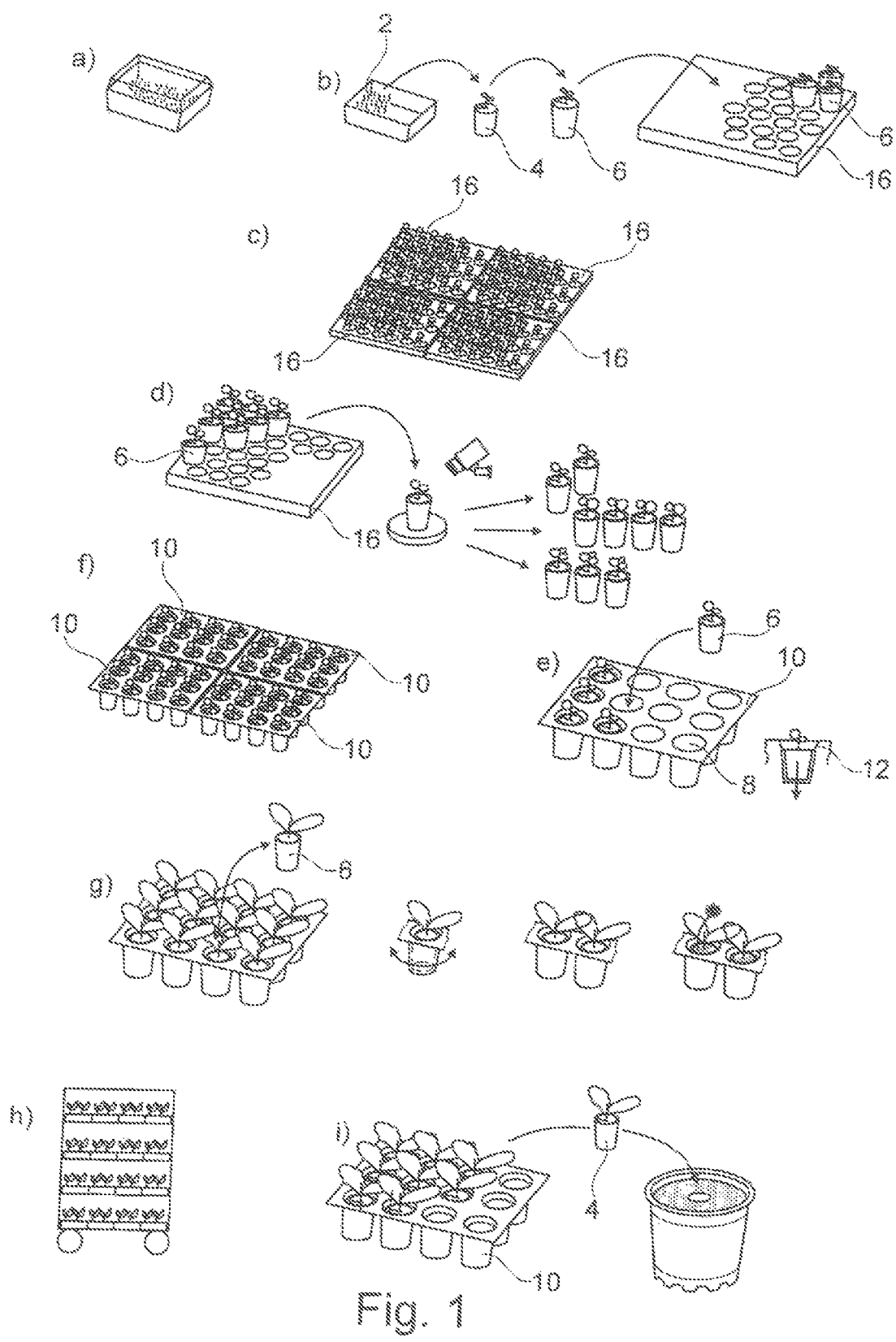
FIG. 1 shows the method according to the invention.

FIG. 1 a) shows the provision of seedlings 2 to carry out the method. In a first method step, these are introduced into a substrate 4 in the form of a plug (FIG. 1 b). To this end, the plug is slitted longitudinally. The plug is bent open at the slit and the seedling 2 is introduced into the plug. The seedling 2 with the substrate 4 is subsequently introduced into a plant pot 6.

Multiple such plant pots 6, into which a seedling 2 with substrate 4 has been introduced in each case, are arranged close to one another in a crate 16. Here, the crates 16 serve for simplified handling of the plant pots 6 arranged close to one another.

FIG. 1 c) depicts the growth phase following the introduction of the seedlings 2 into the plant pots 6. Multiple crates 16 are arranged next to one another for better utilization of space.

At the end of this first growth phase, the individual plants are subjected to a visual evaluation (FIG. 1 d). Here, this is done in an automated manner. A picture of one or more plants is taken and automatically evaluated. The plants are subsequently sorted according to developmental state. For example, this sorting can be done into three categories, "poorly developed", "normally developed" and "exceptionally developed", based on the size, shape and/or number of leaves or others of the above-mentioned features or combinations of features.

In a next method step, depicted in FIG. 1 e), plant pots 6 containing plants assigned to the same category are introduced into the cells 8 of a tray 10. In this connection, the plant pots 6 are introduced into the cell 8 of the tray 10 until a cell wall 12 which is impenetrable for roots and especially unbreached towers above the plant pot 6. In the exemplary method, the plant pots 6 are immobilized in the cell 8 of the tray 10 at this point, immobilization meaning here an immobilization with respect to movements of the plant pot 6 out of the cell 8 of the tray 10. At the same time or in addition, prevention of rotational movements in the cell 8 can be achieved, but does not on its own represent immobilization in the context of this method.

Upon transfer from the crates 16 into the trays 10, the plants are relocated at a greater interval in relation to one another. What is achieved by the introduction of the plant pots 6 such that an uninterrupted cell wall 12 towers above the plant pot 6 is that there is a reduction in formation of epiphyte roots which protrude across into an adjacent cell 8. A connection between two adjacent and especially approximately identically sized plants via such roots protruding from their cell 8 is thus largely avoided.

The introduction of the plant pots 6 is followed by a second growth phase (FIG. 1 f). Here too, there is again arrangement of multiple trays next to one another. As a result of combining plants which reached a similar developmental state after the first growth phase, said plants can be treated identically in the second growth phase. For example, it is conceivable that the second growth phase is shortened for plants in a tray 10 containing the plants which were exceptionally developed at the end of the first growth phase, in comparison with the second growth phase for plants in a tray 10 containing the plants which were only poorly developed at the end of the first growth phase. Using the method, it is thus possible, especially as a result of putting together similarly developed plants in a tray 10, for the conditions in the second growth phase to be optimally tailored to the needs of said plants, with the advantages brought about by the method according to the invention being realized at the same time.

FIG. 1 g) shows the configuring of the tray 10 and especially of the plants situated in the inserted plant pots after completion of the second growth phase. Here, the plants which are sub-standardly developed at the end of the second growth phase compared to the other plants in the tray 10 are removed with their plant pots 6 from the tray 10 and replaced with plant pots 6 containing similarly developed plants. Furthermore, the plants are oriented by twisting of the plant pots 6 in the cell 8. A marking identifying the tray 10 is affixed on said tray 10. For example, this can be achieved by the application of a self-adhesive label containing a number or a machine-readable character code such as, for example, a bar code. The marking can, however, also be stamped into or printed on the tray 10. Other marking options are also conceivable.

Furthermore, fertilizer can be introduced into the plant pots 6 in the tray 10 and/or the substrate can be covered, for example with a non-woven fabric. The configured trays 10 are combined in a trolley and taken to the next processing step (FIG. 1 h}.

Subsequently, the cultivated plants with the substrate 4 are removed from the plant pot 6 immobilized in the tray 10, the plant pot 6 remaining in the cell 8 of the tray 10. The plant with the substrate 4 is then, for example, replanted into a larger substrate-filled plant pot (FIG. 1 i).

Figure 2:
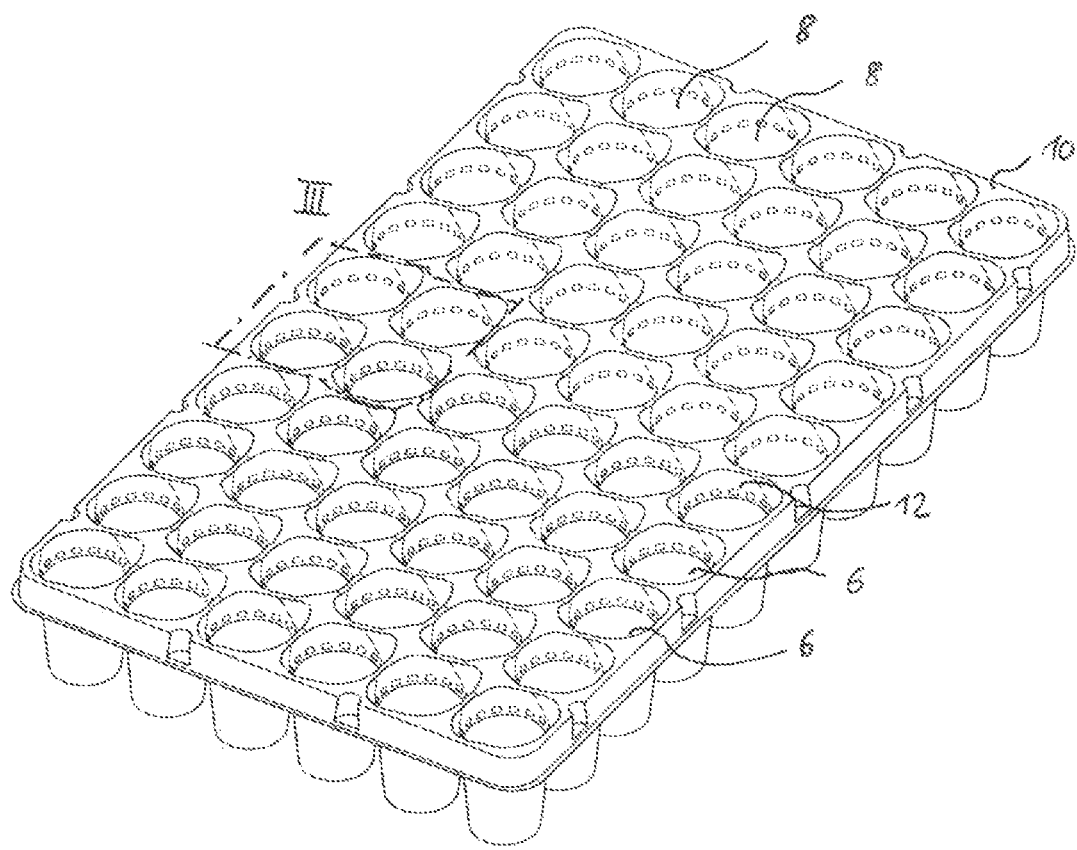
FIG. 2 shows a system for carrying out the method according to the invention.

FIG. 2 shows a system for carrying out the method, comprising a tray 10 having multiple cells 8. What are depicted are plant pots 6 introduced into some of these cells 8 such that a cell wall 12 which is impenetrable for roots and especially unbreached towers above the plant pot 6 in each case. In the region of the cell wall 12 towering above the plant pot 6, the tray 10 has elements 14, by means of which the plant pot 6 is immobilized in the cell 8. Here, immobilization of the plant pot 6 means that the plant pot 6 is secured against removal. Twisting of the plant pot 6 can be prevented by the securing mechanism, but this is not absolutely necessary. The elements 14 are designed as catching lugs. The plant pot 6 is immobilized by the complete introduction of the plant pot 6 into the cell 8. By means of top-side approach slopes, introduction is easy to realize, whereas a bottom-side edge of the catching lug acts on the edge of the plant pot 6 such that simple removal of the plant pot 6 from the cell 8 is prevented.

Figure 3:
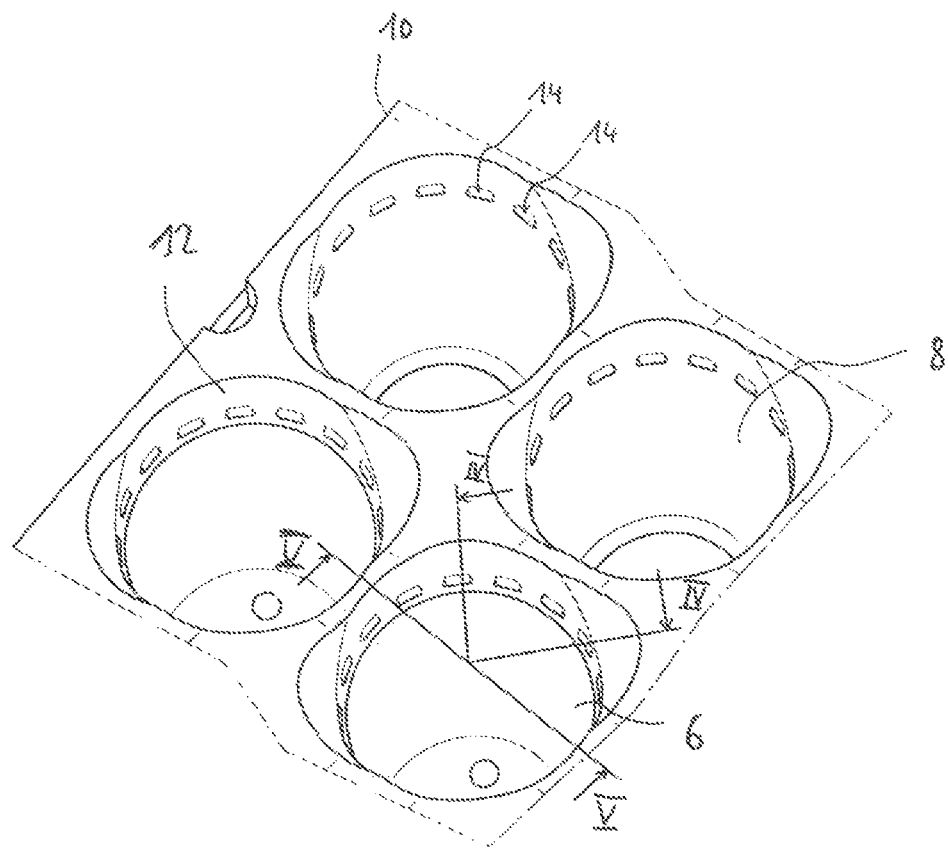
FIG. 3 shows a detailed view of the system as per FIG. 2.
Figure 4:
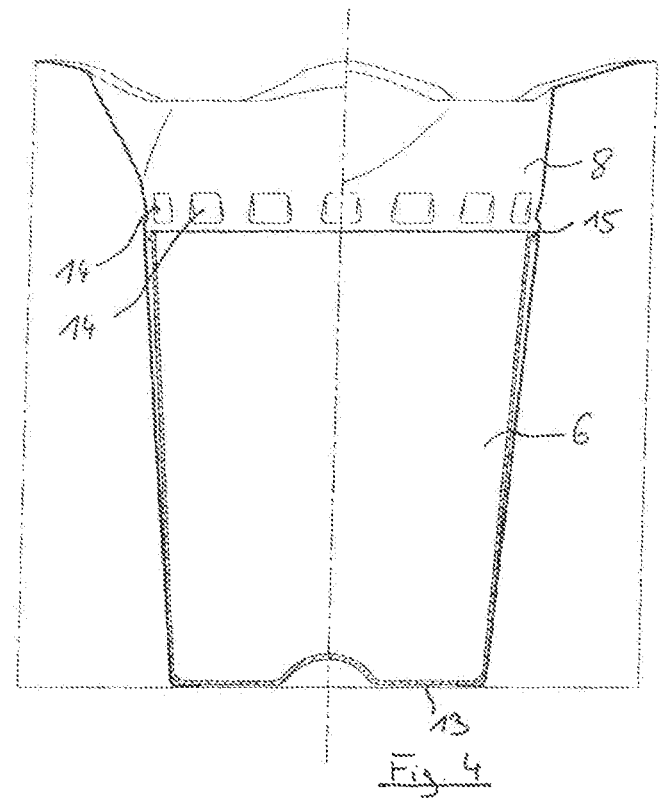
FIG. 4 shows a sectional view according to IV-IV in FIG. 3.
Figure 5:
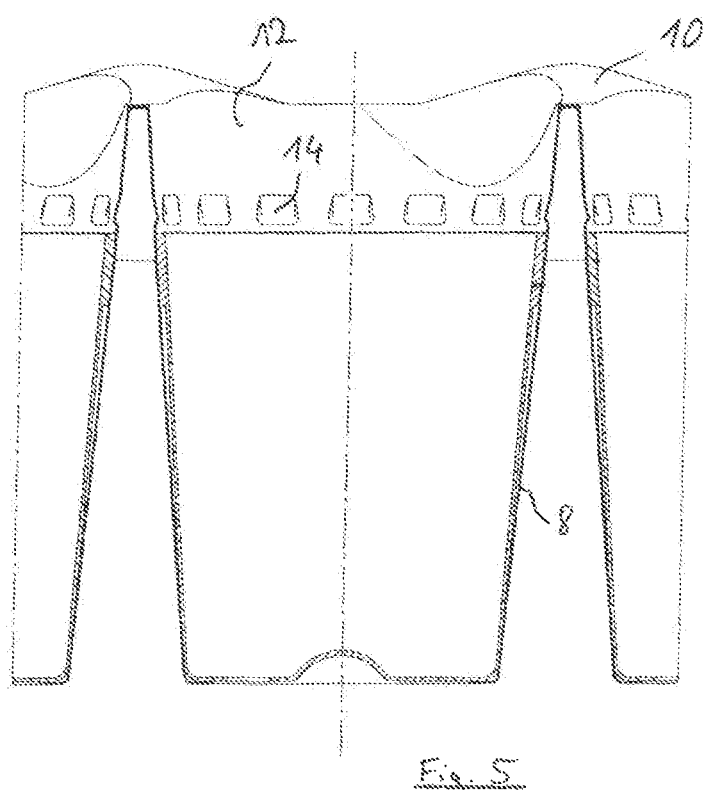
FIG. 5 shows a sectional view according to V-V as per FIG. 3.

FIG. 3 shows an enlarged view of detail Ill. Four cells 8 are depicted. Plant pots 6 are introduced into two of the cells 8, wherein they are immobilized by the elements 14 designed as catching lugs. FIG. 4 and FIG. 5 show sectional views through a cell 8 containing introduced plant pot 6 as per sectional profile IV-IV and V-V, respectively, in FIG. 3.

The plant pot 6 introduced into the cell 8 has an unbreached side wall. Said side wall forms, together with the unbreached cell wall 12, a complete lateral boundary of the plant growth region above the plant pot base 13. The upper outer edge 15 of the plant pot 6 fits closely on the cell wall 8. The region between outer edge 15 of the plant pot 6 and cell wall 8 is thus impenetrable for roots of the plant.

The invention claimed is:

1. A method cultivating a plant, the method comprising the steps of:
    introducing a seedling at least partially surrounded by a substrate into a plant pot,
    introducing the plant pot into one of multiple cells of a tray and the plant pot being immobilized in the cell,
    the plant pot being introduced into the cell of the tray until a cell wall, which is impenetrable for roots and unbreached, extends above the plant pot.

2. The method according to claim 1 wherein the plant pot and cell of the tray are matched with one another such that a crossing point between the upper outer edge of the plant pot and the cell wall is impenetrable for roots.

3. The method according to claim 1, wherein the cultivated plant with the substrate is removed from the plant pot immobilized in the tray, the plant pot remaining in the cell of the tray.

4. The method according to claim 1, wherein the plant in the plant pot is cultivated in at least two growth phases, the plant pots being repositioned at greater intervals between first and second growth phase.

5. The method according to claim 4 wherein the plant pots are arranged in crates for the first growth phase.

6. The method according to claim 4, wherein the plant pots are arranged in the tray for the second growth phase.

7. The method according to claim 4, wherein the plant pots are sorted after the first growth phase on the basis of features to assess the development of the plants.

8. The method according to claim 2, wherein the sorting is done by means of an automated visual evaluation.

9. The method according to claim 1, wherein the tray and/or the plants situated in the inserted plant pots are configured at the end of cultivation.

10. The method according to claim 9 wherein the plants are oriented by twisting the plant pots in the tray.

11. The method according to claim 9, wherein fertilizer is introduced into the plant pots.

12. The method according to claim 9, wherein the tray and/or the plant pots are labelled.

* * * * *